Aug. 13, 1929.   R. FREY   1,724,757
LIGHTING PLANT FOR VEHICLES
Filed April 16, 1928   2 Sheets-Sheet 2
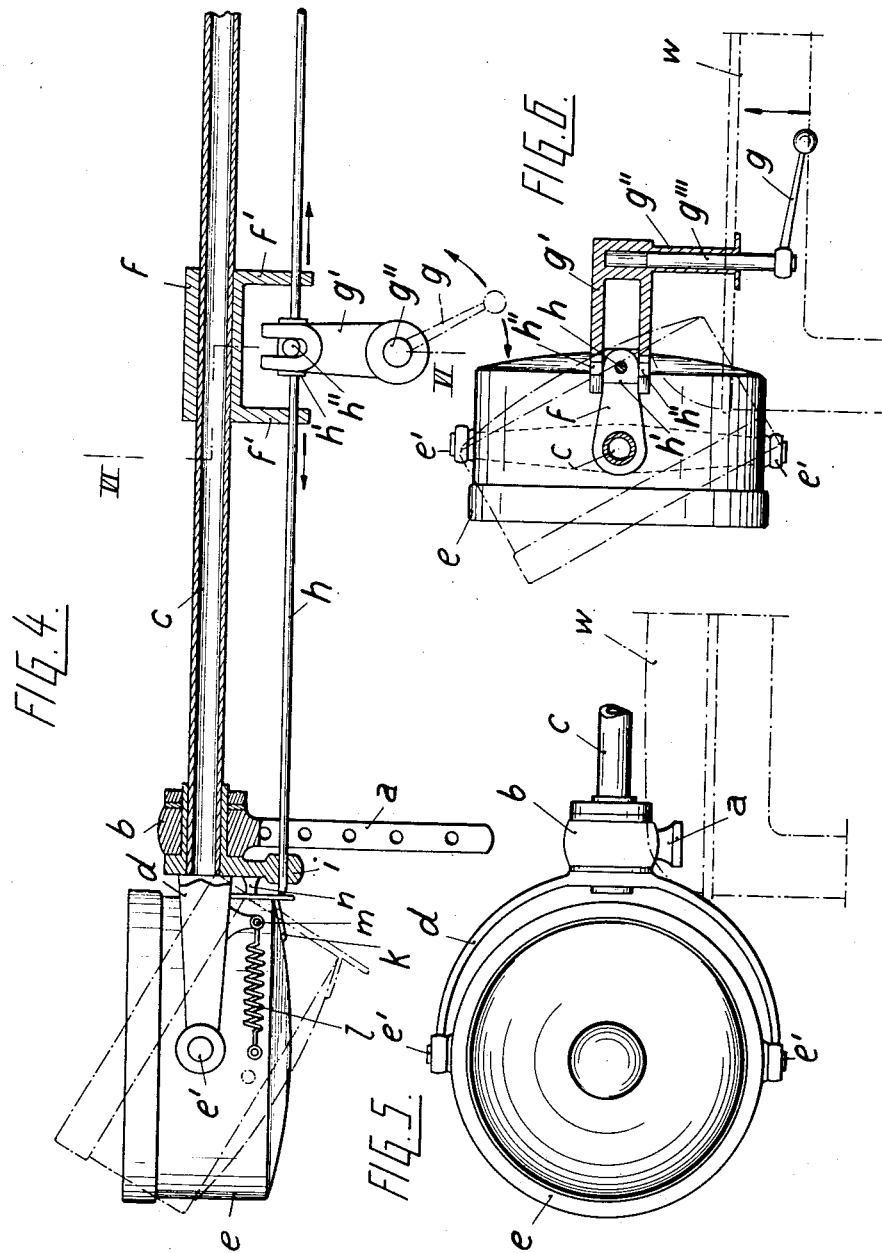

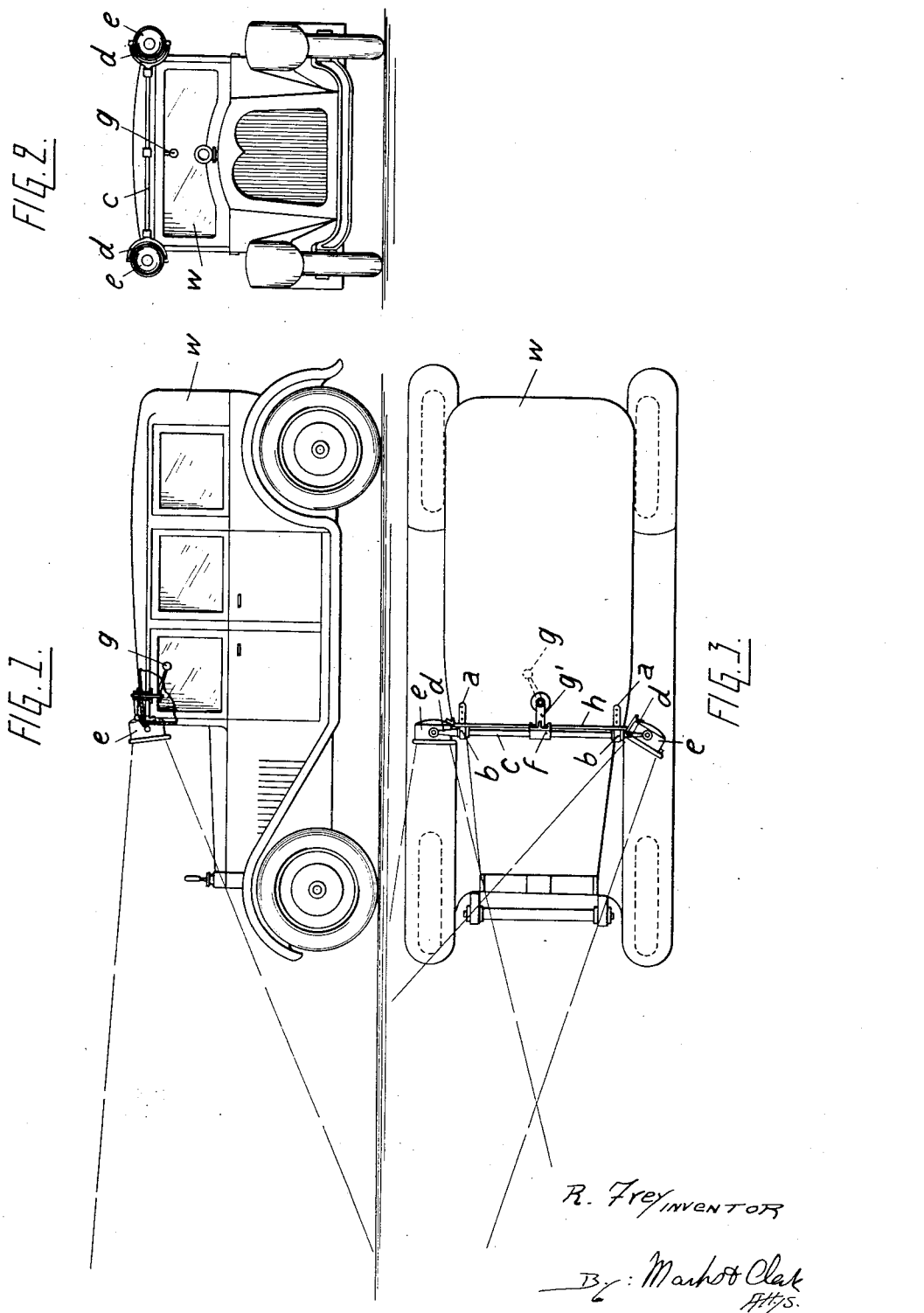

Patented Aug. 13, 1929.

1,724,757

UNITED STATES PATENT OFFICE.

RICHARD FREY, OF HONGG, ZURICH, SWITZERLAND.

LIGHTING PLANT FOR VEHICLES.

Application filed April 16, 1928, Serial No. 270,469, and in Germany May 2, 1927.

The present invention relates to a lighting system for power vehicles, the lights of which can be simultaneously used for indicating the direction of travelling and consists of two search lights connected together by mechanism and adapted to be dipped together and turned laterally separately from one another.

A feature of the invention resides in the fact that the two search lights, usually provided at a low level at the front of the power vehicle, are located towards the rear of the vehicle and at a level above the horizontal line of vision of the driver so that the rays of light from these search lights can be adjusted to all positions suitable for travelling, or, as desired, may be directed individually upon any object whilst the so called dimming of the search lights can be effected without any reduction of the light by simply dipping the search lights or the rays emanating therefrom. As the search lights are movably mounted it is possible to obtain therewith any desired lighting effects and they may also serve to give indications of direction of travelling which at the present moment is only possible by the use of a number of auxiliary lamps and separate direction indicators, this result being obtained in accordance with the present invention. In addition to the economical advantages of the invention there is also the important advantage that by a simple manipulation, namely, actuating a single lever, all the results indicated above can be obtained which is of considerable importance as regards the increase in safety when travelling.

In the accompanying drawing is illustrated by way of example one form of construction in accordance with the invention.

Figure 1 is a side elevation of a power vehicle provided with the device according to the present invention;

Figure 2 is a front elevation thereof;

Figure 3 is a plan, and

Figures 4 to 6 show details to a larger scale.

In the drawing there is indicated a vehicle $w$ of the closed or sedan type. At the front edge of the roof there are secured two bars $a$ (Figure 4) extending parallel to the longitudinal axis of the vehicle and arranged at uniform distances therefrom. Each of these bars is provided at its front end with a bearing $b$. In these bearings $b$ is rotatably mounted a shaft $c$. The shaft $c$ is provided at each end with a forked holder $d$ in which search lights $e$ are mounted so as to be rotatable about a vertical axis. To the middle of the shaft $c$ is secured a sleeve $f$ having two projecting arms $f_1$ of the same length. Through the ends of these arms $f_1$ passes a rod $h$ parallel to the shaft $c$ and capable of longitudinal movement, the ends of this rod projecting slightly beyond the bearings $b$ and being guided in guides $i$ which rotate with the shaft $c$. The ends of the rod $h$ engage, when the search lights $e$ are directed forwardly, against arms $k$ secured to the search lights. Each search light is also connected with one end of a spiral spring $l$ of which the other end is connected to an eye $m$ provided on the fork $d$ for supporting the search light. The guides $i$ are also provided with a stop $n$ which prevents further movement of the search lights as soon as the rod $h$ when moved in one direction or the other towards the middle has reached its middle or normal position. This rod is connected by a universal connection to arms $g_1$ secured to the upper end of a vertical shaft $g_2$ which is mounted so as to be capable of rotation and axial movement, the lower end of this shaft being connected to a hand lever $g$ capable of being operated from the driver's seat in such a manner as to be capable of being moved upwardly and downwardly and rocked laterally.

It is not absolutely essential for the device to be secured to the roof of the vehicle as it may also be for example secured to the upper frame portion of the wind-shield.

The operation of the device described is as follows: Assuming that the two search lights are in the position illustrated in Figure 2, in which the light rays are projected for a considerable distance in front of the vehicle, and another vehicle is approaching from the opposite direction, then the driver moves the handle $g$ (Figure 6) upwardly in the direction of the arrow. This produces a rotation of the shaft $c$ and both search lights are thus tilted downwardly at an angle so that the light rays from the search lights will not dazzle the driver of the approaching vehicle although the light rays by reason of the high position of the search lights will still be projected a considerable distance in front of the vehicle and will illuminate the road more brightly as the light will be concentrated on a shorter strip of the road.

The possibility of individually turning the search lights to the left or the right is rendered possible by moving the handle *g* (Figure 4) in the direction of the arrow when one of the search lights will be turned inwardly and assume the position shown in broken lines in Figure 4, whilst the other retains its forward position as shown in Figure 3. When moving the lever *g* to the right the left hand search light is turned to the right and reversely when it is moved to the left the right hand search light is turned towards the left. By this arrangement it is possible when passing around curves to have these illuminated in advance without completely moving all the light from the previous direction of travelling.

By means of the arrangement of the search lights as above described and the possibility of moving them the following advantages are obtained:

(*a*) The so called dipping on the approach of a vehicle of the forwardly directed search lights or the rays thereof without varying the source of light can be effected by simply depressing the search lights so that the rays of light which were previously projected directly forwards are now projected downwardly at an angle on the road surface. Without dazzling the driver of an approaching vehicle the road surface in front of a vehicle can be illuminated with the lights depressed for a distance of 50 to 60 metres which is the necessary distance for ensuring effective operation of the brakes.

(*b*) The light can be projected on the road in advance of the vehicle at any distance that may be desired which in the case of approaching vehicles (when a signal is given for dipping at a great distance) has the advantage that the distance of illumination can be successively made shorter and it is unnecessary to slow down in speed.

(*c*) The available source of light in this arrangement is used more efficiently in comparison with the search lights which at the present time are now arranged at a low level at the front of the vehicle whereby the rays reflected upwardly by the parabolic mirrors are lost, as in accordance with the present invention all the rays are projected from the top downwardly.

(*d*) The front outline of the vehicle and the full width of the fenders will be seen by an approaching driver as they are within the range of the lights arranged above them thus rendering the use of separate lights for defining the limits of the width of the vehicle and provided on the front fenders unnecessary.

(*e*) The lateral illumination in advance of the vehicle when driving around a curve while still being able to project a light in the original direction of travelling, that is to say it is possible to obtain all the required illuminating effects, as at the present moment can only be obtained by the use of separate lamps, namely so called finder lamps, thus rendering these unnecessary. It is also possible with the search lights arranged at a high level to conveniently read sign posts and by dipping the search lights through a wider angle it is possible to illuminate the engine.

(*f*) Advantageous illumination is also available in the case of fog in that with inclined search lights the angle of illumination has a wider angle relatively to the particles of fog which does not obscure the vision of the drived. The line of vision in addition also passes between the two rays of light, therefore in a stationary brightness, in an area which is not traversed by the rays. It is, therefore, unnecessary to use separate fog lamps arranged at a low level at the front of the vehicle.

(*g*) This device is at the same time also applicable as a direction indicator and thus replaces the constructions which are used for that purpose at the present time.

(*h*) The operation of all the possibilities of setting the search lights and for the purpose of indicating directions of travel is effected by a single handle with one and the same lever.

I claim:

1. A lighting plant for vehicles comprising a pair of head lights arranged above the driver's head, a shaft on which said head lights are trunnioned, means for rocking said shaft, and means for individually turning said head lights about their trunnions.

2. A lighting plant for vehicles comprising a pair of head lights arranged above the driver's head, a shaft on which said head lights are trunnioned, and means for rocking said shaft and individually turning said headlights about their trunnions.

3. A lighting plant for vehicles comprising a pair of head lights arranged above the driver's head, a shaft on which said head lights are trunnioned, a rotary slide operatively connected with said shaft so as to rock it upon being displaced, and a push bar also operatively connected with said slide so as to be displaced upon rotation of said slide, and to individually turn said headlights about their trunnions.

4. A lighting plant for vehicles comprising a pair of head lights arranged above the driver's head, a shaft on which said head lights are trunnioned, and unitary means for rocking said shaft and for individually turning said head lights about their trunnions.

5. A lighting plant for vehicles comprising a pair of head lights arranged above the driver's head and upon opposite sides of said vehicle, a shaft on which said head lights are trunnioned, and a handle adapted to be moved in a vertical plane and oscillated about a vertical axis for simultaneously elevating and lowering said lights and for individually oscillating said lights to the right or left.

In testimony whereof I affix my signature.

RICHARD FREY.